H. B. COMPTON & W. W. RAMSEY.
ACETYLENE GAS GENERATOR.
APPLICATION FILED JAN. 11, 1908.
924,533.
Patented June 8, 1909.
2 SHEETS—SHEET 2.
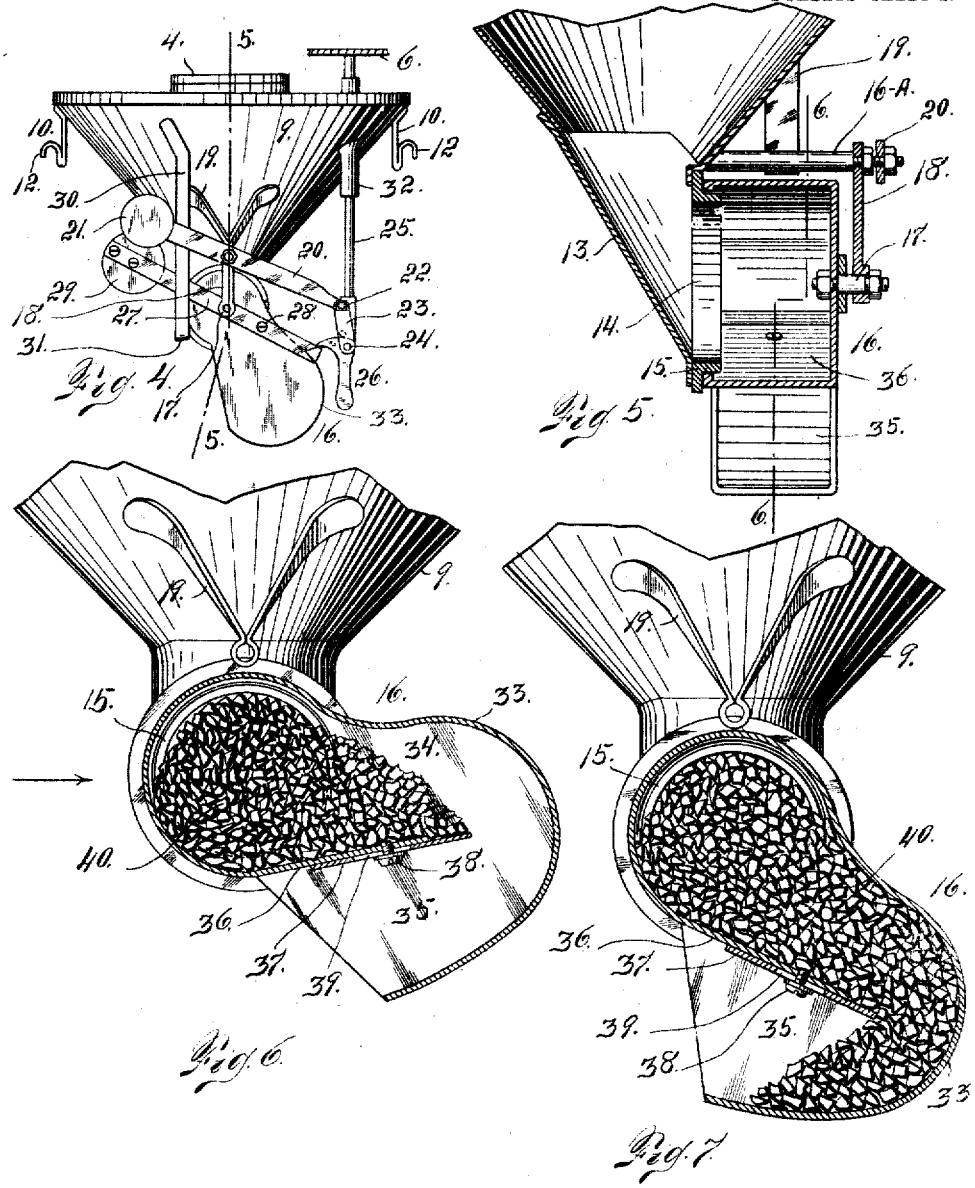
Witnesses
Otto E. Riddick
J. D. Thornburgh
H. B. Compton
W. W. Ramsey
Inventors
Attorney

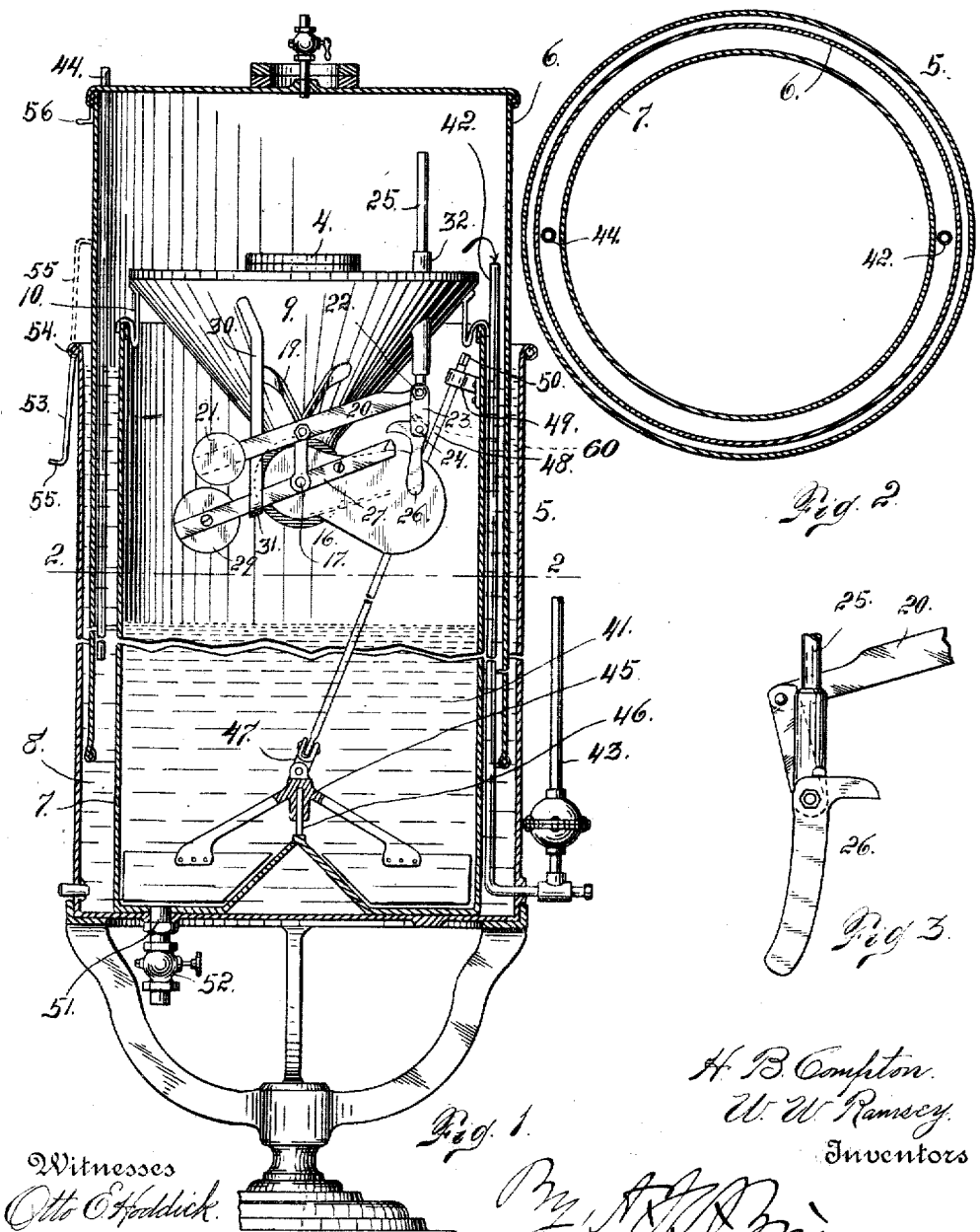

UNITED STATES PATENT OFFICE.

HARRY B. COMPTON, OF DENVER, AND WILLIAM W. RAMSEY, OF COMO, COLORADO.

ACETYLENE-GAS GENERATOR.

No. 924,533.  Specification of Letters Patent.  Patented June 8, 1909.

Application filed January 11, 1908. Serial No. 410,353.

*To all whom it may concern:*

Be it known that we, HARRY B. COMPTON, and WILLIAM W. RAMSEY, both citizens of the United States, the said HARRY B. COMPTON residing in the city and county of Denver, State of Colorado, and the said WILLIAM W. RAMSEY residing at Como, in the county of Park and State of Colorado, have invented certain new and useful Improvements in Acetylene-Gas Generators; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in acetylene gas machines and relates particularly to the mechanism for feeding the carbid to the generator, automatically and in uniform quantities at predetermined intervals, the feed mechanism being operated by the bell of the gasometer which surrounds the generating tank, the gasometer tank being concentric with the generating tank.

In our improved construction a movable feeder is employed, the same being journaled at the lower part of the hopper and in communication therewith. This feeder consists of a housing divided into two intercommunicating compartments by an adjustable partition. Normally the feeder is in position to allow all of the carbid in the lower compartment to escape into the generating tank and after this is accomplished, no more carbid will enter the lower compartment until the bell of the gasometer descends and strikes a rod which is connected with the feeder in such a manner as to impart to the latter a partial rotary movement. The feeder when at its lowest limit of movement allows the carbid to pass into the lower compartment of the housing. The feeder is then released and as it returns to its normal position, the carbid within the lower compartment as well as some of that in the upper compartment of the housing, escapes into the generating tank. When this is done, no more carbid enters the generator until the bell moves upwardly in response to the pressure of the gas generated and then downwardly as the gas is consumed, the downward movement being sufficient to engage the operating rod.

Having briefly outlined our improved construction, we will proceed to describe the same in detail reference being made to the accompanying drawing in which is illustrated an embodiment thereof.

In this drawing, Figure 1 is a central longitudinal section taken through the generating tank and gasometer, the feed mechanism being shown in elevation. Fig. 2 is a horizontal section taken on the line 2—2 Fig. 1. Fig. 3 is a detail view of a pawl mounted on the lower extremity of the operating rod and which aids in the operation of the feeder. In this view the parts are shown on a larger scale. Fig. 4 is an elevation of the feed mechanism shown in detail, the operating parts being approximately in the position corresponding with the position of the bell of the gasometer when at its lowest limit of movement. Fig. 5 is a fragmentary section taken on the line 5—5 Fig. 4, the parts being shown on a larger scale. Fig. 6 is a section taken through the housing of the movable feeder approximately on the line 6—6 Fig. 5. Fig. 7 is a similar view showing the feeder, however, in a different position.

The same reference characters indicate the same parts in all the views.

Let the numeral 5 designate the gasometer tank and 6 the bell thereof. Within this tank is located a generating tank 7 and between these two tanks is a liquid seal 8 in which the lower portion of the bell is always immersed thus preventing the escape of the gas generated in the tank 7.

A hopper 9 is supported by the upper edge of the generating tank, the hopper being provided with hangers 10 provided with hooks 12 adapted to engage the top of the tank and support the hopper in a stable position. The lower extremity of the hopper is provided with a discharge extension 13 which is open on one side as shown at 14, this opening being surrounded by a ring 15 upon which the movable feeder 16 is mounted to rotate.

Projecting from the lower part of the hopper, is a horizontally disposed rod 16ª which is connected with a pin 17 by an arm 18. The rod 16ª is further supported by a bracket 19. The function of the arm 18, is to support the pivot pin 17 upon which the outer wall of the feeder is pivoted, the axis of the pin 17 corresponding with the axis or movement of the feeder when turning on the collar 15. Upon the outer extremity of the rod 16ª beyond the arm 18, is fulcrumed a lever 20 provided at one extremity with a weight 21, its opposite extremity being connected at 22 with a link 23, the link being connected at 24 with the lower extremity of an operating rod 25. To the lower extremity of this rod is also pivotally mounted a pawl 26 which as the rod descends is adapted to act upon a lever 27 fulcrumed on the pin 17 and connected at 28 with the feeder, whereby the feeder and lever move in unison. The pawl is normally held in position to engage the lever 27 by gravity. The lower extremity of the rod 25 is provided with a pin 60 which engages the pawl 26 from above and maintains the latter in the operative position while in engagement with the lever 27. The extremity of this lever 27 remote from the pawl-engaging extremity, is provided with a weight 29. To the hopper is rigidly attached the upper extremity of a strap iron hanger 30 whose lower extremity is hook-shaped as shown at 31. As the feeder returns to its upward limit of movement after being in the position shown in Fig. 4, the weighted arm of the lever 27 descends. This hook 31 engages the said arm and prevents the latter from moving downwardly too far and consequently limits the upward movement of the feeder.

The operating rod 25 passes through a sleeve 32, the latter passing through the hopper and forming a guide for the rod. This rod projects above the top of the hopper, and its upper extremity is in the path of the top of the bell as the latter moves downwardly as the gas is consumed.

The feeder 16 is provided with a housing 33 which is separated into two intercommunicating compartments 34 and 35 by a shelf or partition 36 provided with a plate 37 slidable on the partition and which may be employed to increase or extend the length of the latter. This plate 37 is connected with the partition 36, by a screw 38 passing through a slot 39 formed in the plate. By loosening this screw, the plate may be adjusted to occupy a position beyond the free extremity of the partition 36 (see Fig. 6).

The operation of the feed mechanism may be described as follows, assuming that the feeder is in the position shown in Figs. 1 and 6, that is to say in its normal position, as the bell of the gasometer descends, it finally strikes the upper extremity of the rod 25, and carries the latter together with the feeder and their connections to the position shown in Figs. 4 and 7. During this movement of the feeder, the two levers 20 and 27 together with the pawl 26, have been actuated, the pawl engaging the lever 27 whereby the latter together with the feeder, is actuated. It may be assumed that when the feeder is in its normal position or that shown in Figs. 1 and 6, the carbid 40 is supported upon the partition 36 as shown in Fig. 6, none being in the lower compartment. Now as the feeder is moved to the position shown in Figs. 4 and 7, the carbid enters the lower compartment as shown in Fig. 7, and as the bell moves a short distance farther downwardly, the pawl 26 releases the lever 27, and allows the feeder by means of weight 29 and lever 27 to return to its normal position or that shown in Fig. 6. During this action all of the carbid within the compartment 35 and a portion of that within the compartment 34, falls into the water 41 of the generator. As the carbid enters the water, the generation of gas commences and the bell is caused to move upwardly, allowing the operating rod 25 to return by means of weight 21 and lever 20 to its normal position or that shown in Fig. 1. As the gas is consumed and the bell again descends, the operation just described is repeated. As the gas is consumed, it passes out of the generator through a pipe 42 whose upper extremity is open and whose lower extremity communicates with the distributing pipe 43. The bell of the gasometer is provided with a pipe 44 one extremity of which projects above the bell while the other extremity under ordinary circumstances is immersed in the water seal between the generating tank and the gasometer tank. Both extremities of this pipe are open. The function of this pipe, is to allow the gas to escape if for any reason an excessive accumulation of gas should result. It is evident that as soon as the lower extremity of this pipe is raised above the water between the two tanks, the gas would escape to the atmosphere thus preventing injurious results due to over-generation.

It will be observed that the hopper together with its feeder attachments, may be removed from the generating tank by taking out the bell. This may be done when it is desirable to clean the generating tank and to facilitate the cleaning operation, we have provided an agitating device 45 rotatably mounted on a pin 46 projecting from the central portion of the generating tank. This agitator is connected by means of a universal joint 47, with an operating rod 48 journaled in a bearing 49. The upper extremity 50 of this rod is fashioned to receive a hand crank. When the hopper 9 with its attachment is lifted from the generator, a crank or key may be applied to the extremity 50 of the rod, and the agitator rotated. During this operation the sediment and dirt which has accumulated in the tank escapes through a pipe 51 whose upper extremity communicates with the tank and whose lower portion is provided with a valve 52. This valve is open during the operation of cleaning the tank. Attention is called to the fact that the hopper 9 is provided with a removable cover 4 which is taken off during the filling of the hopper with carbid.

When for any reason it is not desired that the gas generating operation shall be continued, we have made provision for checking the downward movement of the bell of the gasometer before this movement has become sufficient to operate the feeder. To this end we provide a hook-shaped member 53 hinged to the upper extremity of the gasometer tank as shown at 54. Normally this hook hangs downwardly as shown in full lines in Fig. 1. When it is desired to check the downward movement of the bell, the device is thrown to the position shown by dotted lines in Fig. 1 in which event the hook 55 will be in the path of a bracket 56 attached to the upper portion of the bell. The parts 55 and 56 will under the circumstances stated come in contact before the movement of the bell has been sufficient to operate the feed mechanism.

Having thus described our invention, what we claim is:

1. The combination with a generating tank and a gasometer, of a hopper interposed between the bell of the gasometer and the generating tank, a feeder movably connected with the hopper and in communication therewith, the feeder consisting of a housing projecting laterally from the axis of the feeder's movement, a rod provided at its lower extremity with a pawl pivotally connected therewith, the feeder being provided with a part lying in the path of the pawl, whereby as the bell of the gasometer descends and acts on the rod, the feeder is first moved downwardly and then released, a weight connected with the feeder for returning it to its normal position when released, and a weight connected with the rod for returning it to its normal position as soon as the bell rises sufficiently for the purpose, substantially as described.

2. The combination with the generating tank and a gasometer, of a hopper interposed between the bell of the gasometer and the generating tank, a feeder movably connected with the hopper and in communication therewith, a rod provided at its lower extremity with a pawl pivotally connected therewith, the feeder being provided with a part lying in the path of the pawl whereby as the bell of the gasometer descends and acts on the rod, the feeder is first moved downwardly and then released, and means connected with the feeder for automatically returning it to its normal position when released, substantially as described.

3. The combination with a generating tank and a gasometer, of a hopper interposed between the bell of the gasometer and the generating tank, the hopper having a lateral discharge opening surrounded by a bearing ring, a feeder journaled upon the said ring and open to receive the discharge from the hopper through the ring opening, a rod provided at its lower extremity with a pawl pivotally connected therewith, the feeder being provided with a part lying in the path of the pawl whereby as the bell of the gasometer descends and acts on the rod the feeder is moved downwardly and again released, and means connected with the feeder for automatically returning it to its normal position when released, substantially as described.

In testimony whereof we affix our signatures in presence of two witnesses.

HARRY B. COMPTON.
WILLIAM W. RAMSEY.

Witnesses as to the signature of Harry B. Compton:
 A. J. O'BRIEN,
 DENA NELSON.

Witnesses as to the signature of William W. Ramsey:
 H. E. CARROLL,
 J. C. LORD.